W. H. HALSEY.
India Rubber Hat and Cap Band.

No. 53,920.　　　　　　　　　　　　　　　　　　　　Patented April 10, 1866.

WITNESSES:　　　　　　　　　　　　　　　　　　　　INVENTOR

UNITED STATES PATENT OFFICE.

WILLIAM H. HALSEY, OF HOBOKEN, ASSIGNOR TO DAVID N. ROPES, OF ORANGE, NEW JERSEY.

IMPROVEMENT IN THE MANUFACTURE OF INDIA-RUBBER HAT AND CAP BANDS.

Specification forming part of Letters Patent No. 53,920, dated April 10, 1866.

*To all whom it may concern:*

Be it known that I, WILLIAM H. HALSEY, of Hoboken, in the county of Hudson and State of New Jersey, have invented a new and useful Improvement in Hat and Cap Bands; and I do hereby declare that the following is a full, clear, and exact description thereof, and of its mode or manner of operation, reference being had to the accompanying drawings, and to the letters of reference marked thereon, and making a part of this specification.

The nature of my invention consists in the production or manufacture of hat and cap bands, and other similar articles, from hard india-rubber or gutta-percha, or other similarly-vulcanized gums, and in arrangement and construction of suitable machinery or mechanism for forming such articles.

Figure 1:
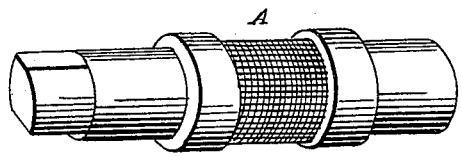
Figure 2:
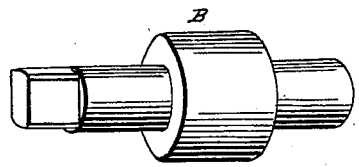
Figure 3:
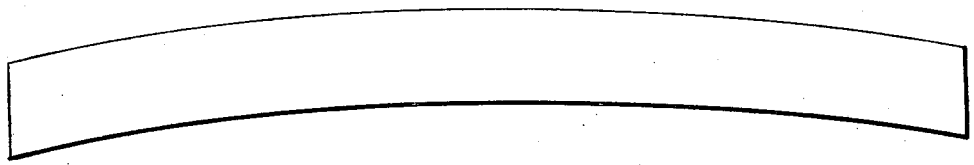
Figure 4:
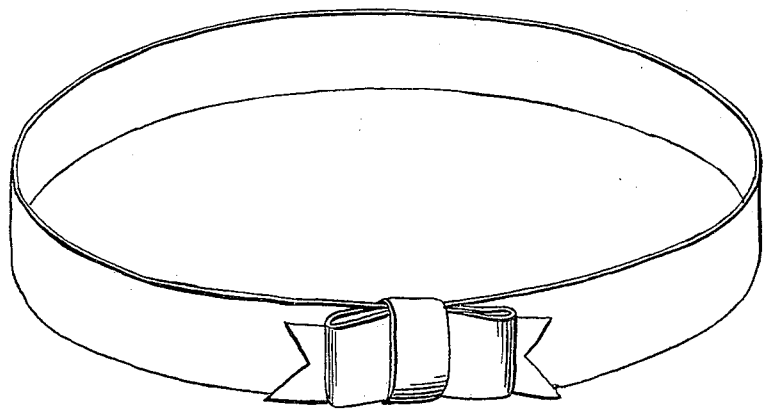

Figures 1 and 2 represent two rollers, adapted to work in connection with each other in the formation of hat or cap bands. Fig. 3 represents a strip of rubber as formed by such rolls, and showing the curve given to it. Fig. 4 shows a hat-band formed from a strip like Fig. 3.

Hat and cap bands, and other similar articles, when made of silk and other woven and braided stuffs, soon become stained and faded by the action of perspiration, the sun, dirt, &c., and thus give to the article upon which worn an old, slovenly, and repulsive appearance, and frequently require to be changed to secure a desirable appearance. By forming such articles of hard rubber or gutta-percha all such effects are prevented, the band retains its first beauty and freshness, and instead of one hat requiring two or three bands, one band will outlast two or three hats.

The rubber or gutta-percha from which such bands are made is vulcanized, in the usual manner, and is rolled out the required thickness and cut in strips of any desired breadth and length. Such strips are then passed between other rollers, like those represented in Figs. 1 and 2, to which motion is given in any convenient manner, and the surfaces of one or both of which are cut or figured as desired, to give a figured surface and appearance to the band.

Fig. 1 represents a roller with the surface finely fluted longitudinally, and finer lines cutting the flutes at right angles; and Fig. 2, a roller with its surface finely fluted, which will give to a strip of rubber passed between them an appearance like the ordinary ribbed hat-band. By thus giving the surface of the band a figured appearance, the band is rendered much more neat, and tasty, and elegant in appearance, and it can be made so much resembling the woven band as to be not distinguishable therefrom. If it is desired to give the band or device a running figure along its edges, this can be done by cutting such device or figure round the rollers, by which it will be transferred to the band. In order, however, that the band should be figured or embossed evenly, and particularly when it is to be ribbed, as shown in Fig. 2, it is necessary that the strip should pass in a straight line through between the rolls. This is effected by sinking or depressing the surface of one of the rolls, as shown in Fig. 1, so that on each side of the operating-surface A of such roll there will be a shoulder, $a$, which will prevent the band curving or turning sidewise and cause it to pass through in a straight line.

The operating-surface, B, of the other roll, Fig. 2, is elevated to correspond with, or fit into, the depression of the former roll. The length of the acting-surfaces of the rolls will correspond with the desired width of the band. By such a construction of the two rolls a regular and even impression is imparted to the band, and its beauty and corresponding value enhanced.

To form, however, a perfect and truly elegant hat-band, it is necessary not only that it should have a surface evenly and artistically figured or embossed, but it should, at the same time, be so shaped that it will conform to the taper of the body of the hat, and to the curve or spring of the brim or bottom of the hat-body. Both these ends I secure by giving to the acting-surfaces of one or both of the rolls a taper, so that as the strip of rubber is passed through between them one of its edges will be reduced in thickness and consequently somewhat lengthened.

Fig. 3 represents a piece of rubber after it has passed between such tapering rolls, stretched out on a plane and showing the curve imparted to it, which is, however, somewhat greater than necessary in the actual formation of the band. The drawings show one roll, Fig. 1, with the acting portion A conical, and the other roll, Fig. 2, with the acting portion B cylindrical. Though the most satisfactory results can be secured by so tapering the acting portion of one or both the rolls, the same result can be produced from straight rolls by setting them closer together at one end than at the other, thereby giving them an inclined position in respect to each other, and, in fact, securing the tapering form; but whether the rolls are made tapering or placed at an inclined position in respect to each other, the surface of one roll should be sunk, and that of the other raised or elevated, as described, so as to cause the rubber to pass in a straight line between the rolls to properly receive the impression to be given it.

By the use of such tapering or inclined rolls the band or piece of rubber is stretched on one side, so as to adapt it to the taper of the body of the hat, and it thereby also conforms to the curve or spring of the body, where connecting with the brim. If, however, the band is to be used upon a hat having no taper, or for a purpose where it is not necessary that one edge should be stretched or made longer than the other, the rubber will be passed between parallel rolls, by which it will be figured or ornamented without being otherwise changed.

Fig. 4 represents a complete hat-band made as described. The ends of the band are secured together by a metallic or rubber slide, of a width just sufficient to admit the band, or it may be fastened by a bow, as represented.

Such a band, so made, of such a material, has all the appearance and elegance as when made of woven stuffs; but will not fade or become dull and disfigured from perspiration, rain, sun, dirt, dust, &c., and can be easily and quickly cleaned and rendered as fresh and lustrous as if new.

What I claim as my invention, and desire to secure by Letters Patent, is—

The combination of the two rollers with their surfaces prepared as described, one roll having a sunken or depressed, and the other an elevated surface, substantially as and operating as and for the purposes set forth.

WM. H. HALSEY.

Witnesses:
  S. D. LAW,
  FRED. B. SEARS.